United States Patent [19]

Georges

[11] Patent Number: 5,279,485
[45] Date of Patent: Jan. 18, 1994

[54] CABLE CLAMP AND SPACER ASSEMBLY

[76] Inventor: Tom G. Georges, R.R. #2, Box 184, Falls City, Nebr. 68355

[21] Appl. No.: 952,320

[22] Filed: Sep. 28, 1992

[51] Int. Cl.[5] ............................................. F16L 3/08
[52] U.S. Cl. ................................ 248/68.001; 248/61; 248/63; 248/74.1; 174/41
[58] Field of Search ......................... 248/61, 63, 65, 74.1, 248/68.1, 62, 64, 74.2, 74.3, 74.4; 174/40 R, 41, 42, 146, 45 R, 45 TD, 40 TD, 40 CC, 135

[56] References Cited

U.S. PATENT DOCUMENTS

| | | | |
|---|---|---|---|
| 1,857,277 | 5/1932 | Goodwin et al. | 248/63 |
| 1,873,357 | 8/1932 | St. John | 248/61 |
| 2,907,812 | 10/1959 | Sorflaten et al. | 248/63 X |
| 3,514,523 | 5/1970 | Hildebrand et al. | |
| 3,924,055 | 12/1975 | Moore et al. | |
| 3,996,414 | 12/1976 | Artbauer et al. | |
| 4,397,435 | 8/1983 | Fisher et al. | 248/61 |
| 4,562,982 | 1/1986 | McSherry et al. | |
| 4,618,114 | 10/1986 | McFarland | 248/65 |
| 4,783,029 | 11/1988 | Geppert et al. | 248/65 X |
| 5,016,842 | 5/1991 | Suzuki et al. | 248/74.1 X |
| 5,103,554 | 4/1992 | Homefeld | 248/61 X |

Primary Examiner—Rinaldi Rada
Attorney, Agent, or Firm—Leon Gilden

[57] ABSTRACT

An elongate spine plate is arranged to include a support block at its first end, with the support block having a first semi-cylindrical recess spaced from and parallel to a second semi-cylindrical recess to position and secure first and second cables. The spine plate includes an attached support housing at its second end, the support housing including a housing insert to secure the first cable in a coaxially aligned relationship relative to the support block.

6 Claims, 4 Drawing Sheets

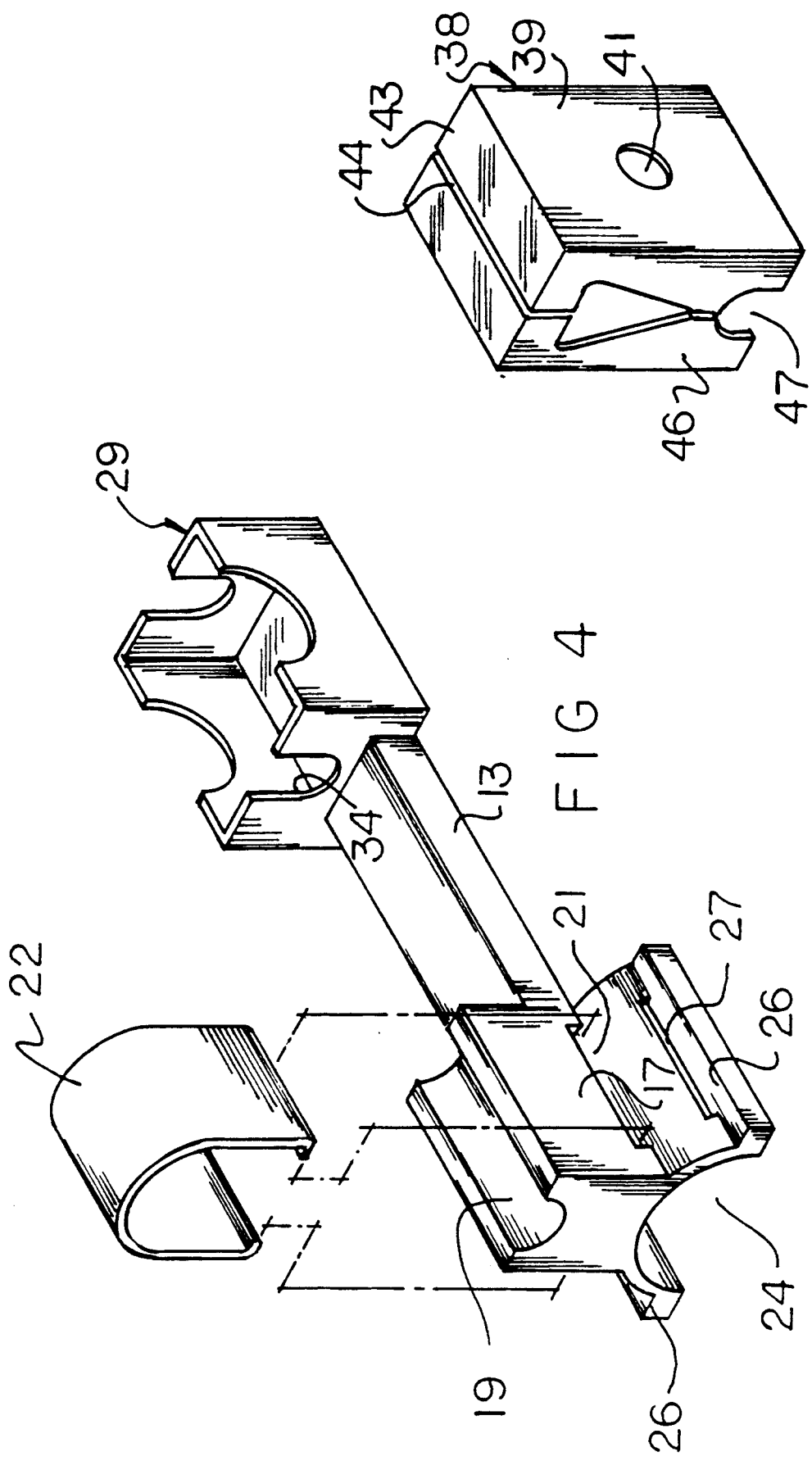

CABLE CLAMP AND SPACER ASSEMBLY

BACKGROUND OF THE INVENTION

1. Field of the Invention

The field of invention relates to cable clamp structure, and more particularly pertains to a new and improved cable clamp and spacer assembly wherein the same is arranged to secure and space cables relative to one another to avoid electrical interference between such cables.

2. Description of the Prior Art

Cable spacer and clamp structure is exemplified in the prior art and set forth in such patents as U.S. Pat. No. 3,996,414 to Artvauer having a spacer for high voltage cables configured as a ring member. Similarly, U.S. Pat. No. 3,514,523 to Hildebrand, et al. sets forth a further ring-like structure for spacing of a cable. U.S. Pat. No. 3,924,055 to Moore sets forth clamp structure to effect spacing of a plurality of cables relative to one another, as does U.S. Pat. No. 4,562,982 to McSherry.

The instant invention attempts to overcome deficiencies of the prior art by providing for cable alignment and spacing structure to include clamping of the cables in an efficient and effective manner not addressed by the prior art and in this respect, the present invention substantially fulfills this need.

SUMMARY OF THE INVENTION

In view of the foregoing disadvantages inherent in the known types of cable clamp structure now present in the prior art, the present invention provides a cable clamp and spacer assembly wherein the same is arranged to clamp and secure a plurality of cables relative to one another. As such, the general purpose of the present invention, which will be described subsequently in greater detail, is to provide a new and improved cable clamp and spacer assembly which has all the advantages of the prior art cable clamp structure and none of the disadvantages.

To attain this, the present invention provides an elongate spine plate including a support block at its first end, with the support block having a first semi-cylindrical recess spaced from and parallel a second semi-cylindrical recess to position and secure respective first and second cables therethrough, with the spine plate having a support housing at its second end, the support housing including a housing insert to secure the first cable in a coaxially aligned relationship relative to the support block.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cable clamp and spacer assembly which has all the advantages of the prior art cable clamp structure and none of the disadvantages.

It is another object of the present invention to provide a new and improved cable clamp and spacer assembly which may be easily and efficiently manufactured and marketed.

It is a further object of the present invention to provide a new and improved cable clamp and spacer assembly which is of a durable and reliable construction.

An even further object of the present invention is to provide a new and improved cable clamp and spacer assembly which is susceptible of a low cost of manufacture with regard to both materials and labor, and which accordingly is then susceptible of low prices of sale to the consuming public, thereby making such cable clamp and spacer assemblies economically available to the buying public.

Still yet another object of the present invention is to provide a new and improved cable clamp and spacer assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of the invention illustrating the first clamp web.

FIG. 5 is an isometric illustration of the cable housing insert utilized by the invention.

DESCRIPTION OF THE PREFERRED EMBODIMENT

Figure 1:
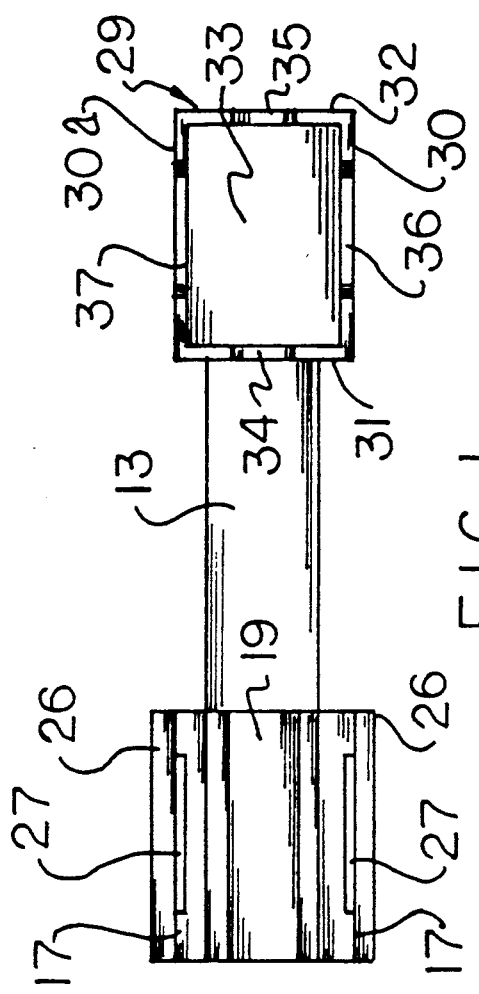
FIG. 1 is an orthographic top view of the instant invention.
Figure 2:
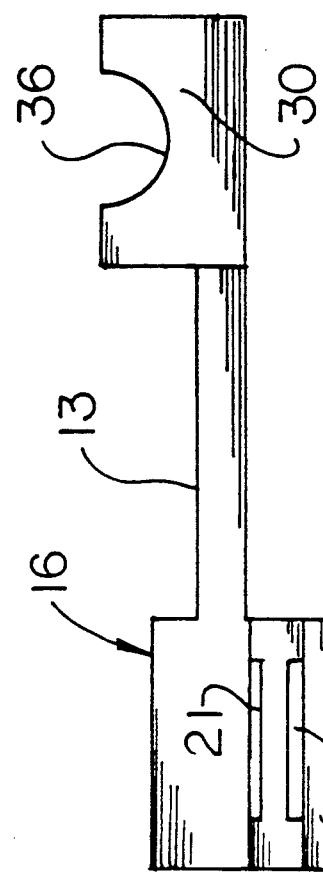
FIG. 2 is an orthographic side view of the invention.
Figure 3:
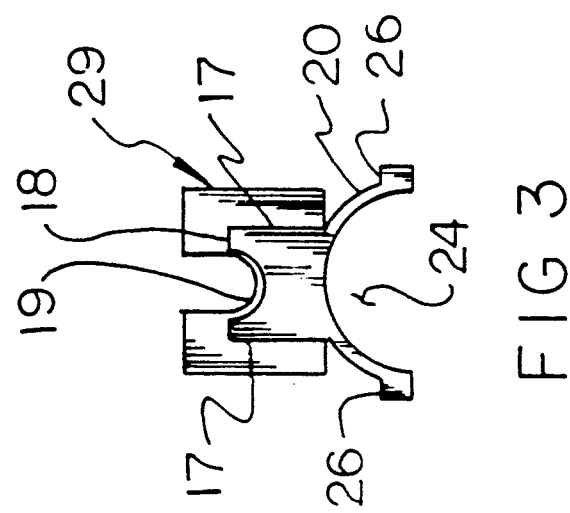
FIG. 3 is an orthographic end view of the invention.

With reference now to the drawings, and in particular to FIGS. 1 to 8 thereof, a new and improved cable clamp and spacer assembly embodying the principles and concepts of the present invention and generally designated by the reference numeral 10 will be described.

Figure 8:
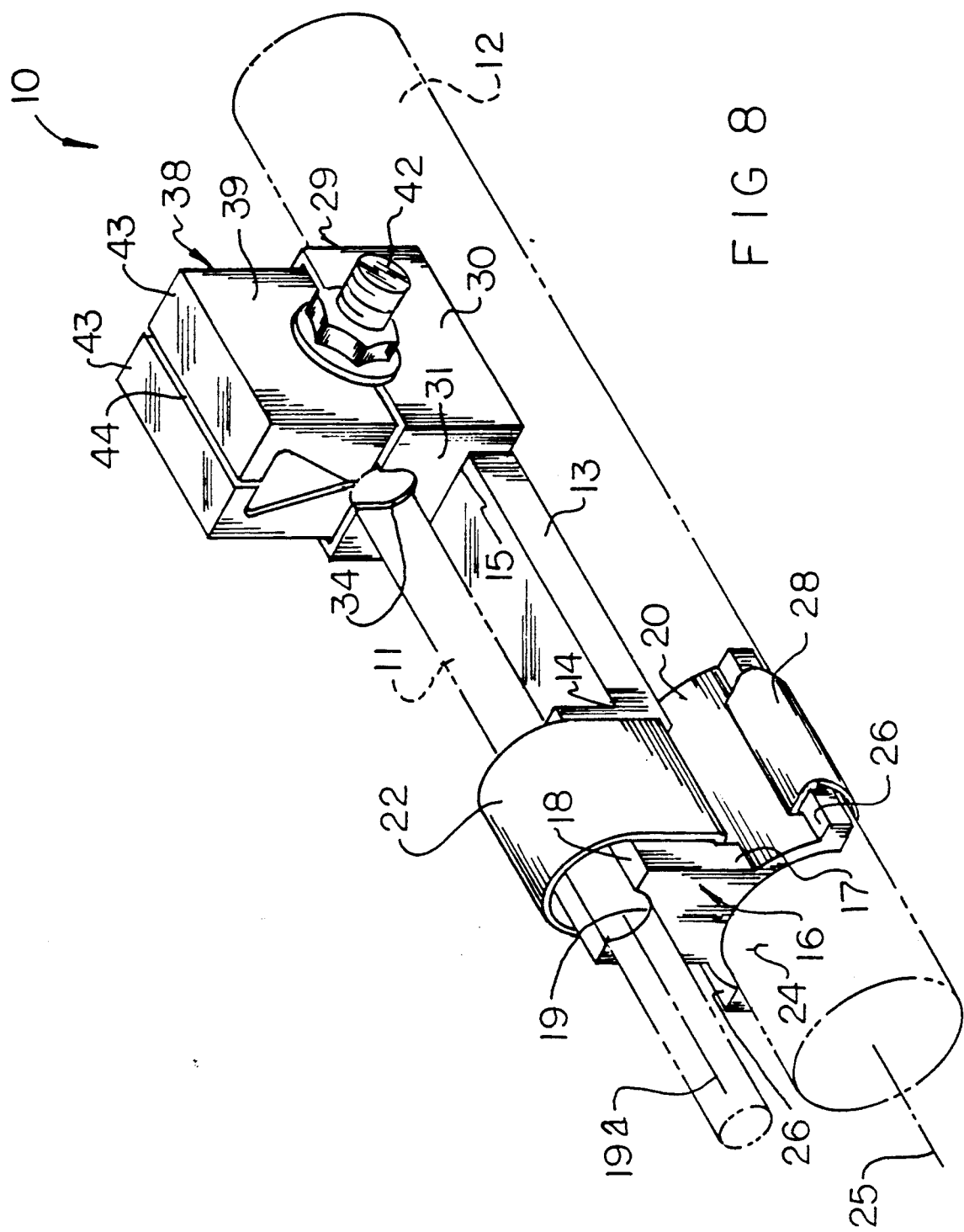
FIG. 8 is an isometric illustration of the invention in an assembled configuration.

More specifically, the cable clamp and spacer assembly 10 of the instant invention is arranged to secure and space a first and second cable 11 and 12 relative to one another, in a manner as indicated in FIG. 8. The assembly includes a central spine plate 13 longitudinally aligned having a spine plate first end 14 spaced from a spine plate second end 15. The first end 14 includes a support block 16 mounted thereto, with the second end 15 having a support housing 29 fixedly secured thereto.

The support block 16 includes support block spaced parallel side walls 17 having a block top wall 18. A first semi-cylindrical recess 19 is directed into the support block 18 having a first axis 19a. The support block includes a support block base 20, with support block base slots 21 directed into the support block, with one of the slots 21 directed into each of the side walls 17 at an intersection with the support block base 20. The slots 21 are arranged in a parallel and coextensive relationship relative to one another and parallel to the first axis 19a. A first arcuate clamp web 22 is arranged to project over the first semi-cylindrical recess 19 and received within each of the support block slots 21 to clamp the first cable 11 to the support block 16. A second semi-cylindrical recess 24 is directed into the support block base 20 having a second axis 25 parallel and spaced from the first axis 19a, with the second recess positioned below the first semi-cylindrical recess 19. The base 20 includes base flanges 26 arranged in a parallel coextensive relationship relative to one another and to the first axis and the second axis 25, with base flange slots 27 provided directed into the base 20 at each intersection of each flange 26 with the base 20. A second arcuate clamp web 28 is arranged to engage the base flanges 26 and be received within the associated slots 27 and to extend over the second semi-cylindrical recess 24 to secure the second cable within the second recess.

The support housing 29 mounted to the spine plate second end 15 includes a housing first side wall 30 spaced from a housing second side wall 30a, with a housing first end wall 31 spaced from and parallel a housing second end wall 32, wherein the housing has a housing cavity within the side and end walls and a housing floor 33. The first end wall 31 includes a first end wall semi-cylindrical recess coaxially aligned with a second end wall semi-cylindrical recess 35 within the second end wall. The first and second end wall semi-cylindrical recesses 34 and 35 are coaxially aligned relative to one another and to the first axis 19a to maintain alignment of the first cable 11. First end second side wall recesses 36 and 37 are coaxially aligned and are orthogonally oriented relative to the first axis 19a for finger access of the housing insert 38 arranged for reception within the housing 29. The housing insert 38 includes insert side walls 39, each having a side wall bore 41 that are coaxially aligned and are orthogonally oriented relative to the first axis 19a, with the side wall bores 41 receiving a side wall bore fastener 42 therethrough, with the fastener arranged for securement of the insert to the housing 29. The housing insert 38 further includes an insert top wall having a top wall 43 slot 44 coextensive with the top wall parallel to the first axis 19a to permit opening of the insert to accommodate and receive the first cable 11 therewithin. The insert having insert end walls 46, with each end wall including an insert end wall semi-cylindrical opening 47 that are coaxially aligned relative to one another and to the first axis 19a when the insert is positioned within the housing 29 to secure the first cable within the housing 29.

Figure 6:
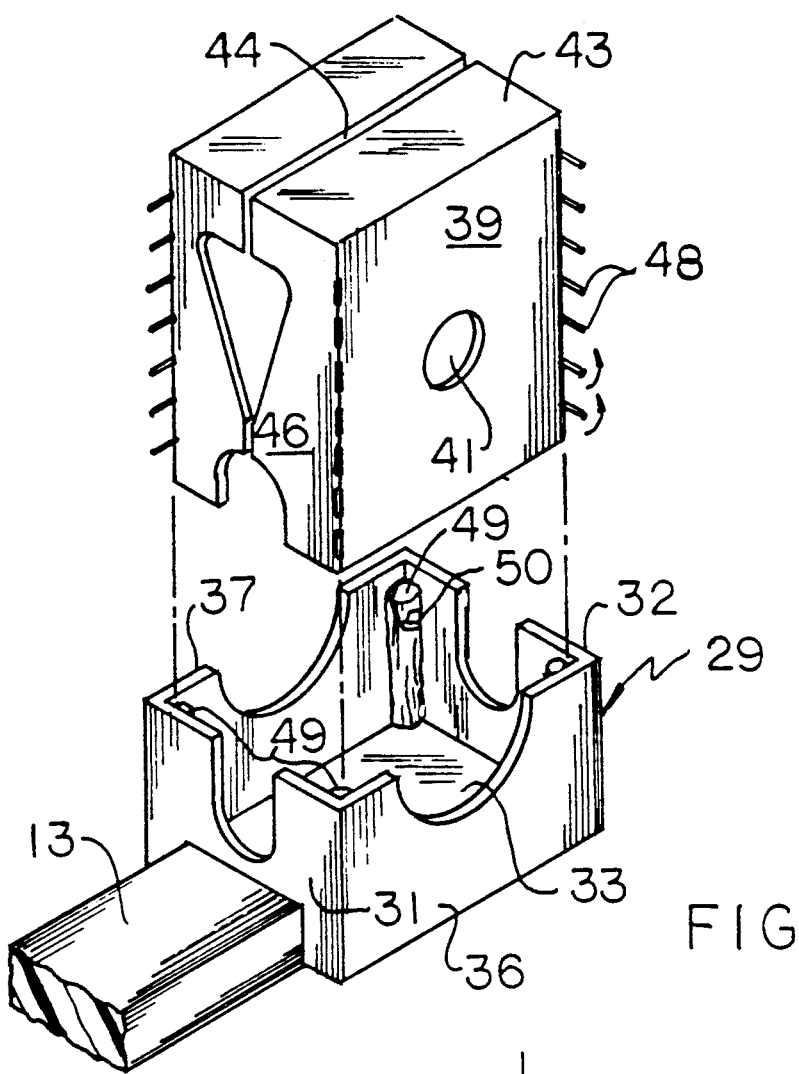
FIG. 6 is an isometric illustration of a modified insert structure of the invention in cooperation with adhesive capsules utilized by the cable clamp support housing.
Figure 7:
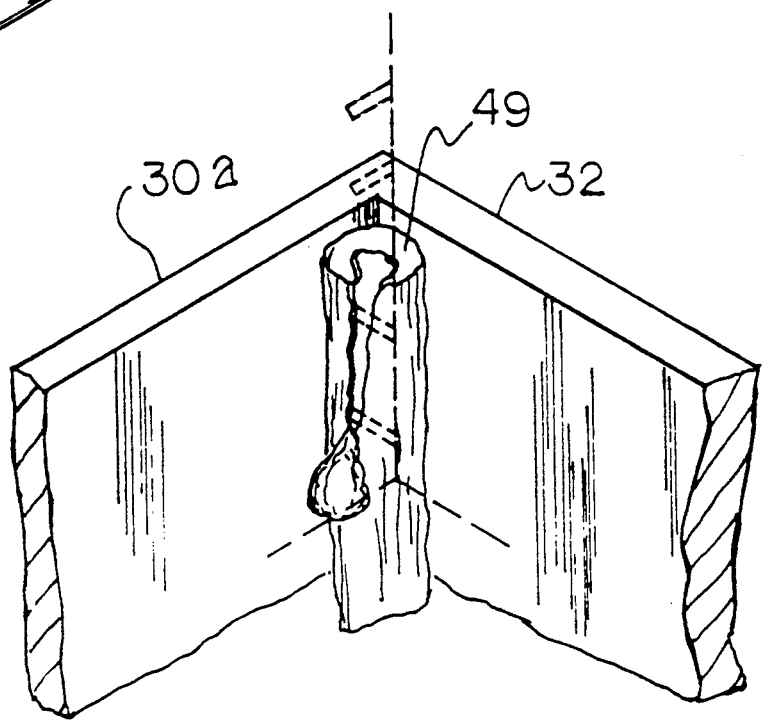
FIG. 7 is an enlarged isometric illustration of the adhesive capsule and its cooperation with the optionally employed piercing legs.

The FIGS. 6 and 7 indicate the use of optional piercing legs 48 mounted to each corner of the insert at each intersection of the insert side walls 39 with the insert end walls 46. The piercing legs 48 are pivotally mounted to each corner and are initially canted downwardly relative to the top wall. Cooperating with the piercing legs 48 are adhesive capsules 49, one positioned within each corner of the housing cavity orthogonally oriented relative to the housing floor 33. Each adhesive capsule 49 includes a fluid adhesive 50 contained therewithin (see FIG. 6). Upon projection of the insert within the housing cavity, the piercing legs pivot about the insert to pierce the glue and anchor the piercing legs and the insert within the housing to insure permanent positioning and mounting of the insert, as well as the first cable within the housing 29.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cable clamp and spacer assembly arranged for spacing and securing a first cable and a second cable, wherein the assembly comprises, an elongate spine plate, the spine plate having a first end spaced from a second end, and a support block mounted fixedly to the first end and a support housing mounted to the second end, the support block including support block side walls, a support block top wall, and a support block base, and the support block top wall having a first semi-cylindrical recess, the support block base having a second semi-cylindrical recess, with the first semi-cylindrical recess oriented about a first axis, the second semi-cylindrical recess oriented about a second axis, with the first axis parallel to the second axis, and first clamp means mounting the first cable within the first recess, and second clamp means for mounting the second cable within the second recess, and the support housing including support housing first and second end walls, with the first and second end walls including respective first and second end wall semi-cylindrical recesses, with the first and second semi-cylindrical recesses coaxially aligned with the first axis receiving the first cable therethrough, and third clamp means for securing the first cable within the support housing and the third clamp means received within the support housing.

2. A cable clamp and spacer assembly as set forth in claim 1 wherein the support block includes support block slots, with one of said slots directed into each of the support block side walls at an intersection of the side walls, with the support block base and the first clamp means configured as a first arcuate web, and the web arranged for orientation over the first semi-cylindrical recess and the first web having first web ends, and each of the first web ends received within one of said support block slots.

3. A cable clamp and spacer assembly as set forth in claim 2 wherein the support block base includes base flanges parallel and coextensive relative to one another positioned on opposed ends of the support block base, and the second clamp means includes a second arcuate clamp positioned over the second semi-cylindrical recess, and each of the base flanges includes a base flange slot at an intersection with each of said base flanges, with the support block base and the second clamp web having second clamp web ends, and each of said second clamp web ends received within one of said base flange slots.

4. A cable clamp and spacer assembly as set forth in claim 3 wherein the third clamp means includes a housing insert, the housing insert includes insert side walls, and insert end walls, and the insert side walls each include a side wall bore, the side wall bores coaxially aligned relative to one another and orthogonally oriented relative to the first axis, and a fastener directed through the side wall bores above the first axis, and the fastener securing the insert to the support housing.

5. A cable clamp and spacer assembly as set forth in claim 4 wherein the insert end walls each include an end wall semi-cylindrical opening, and each semi-cylindrical opening coaxially aligned with the first axis, and the insert having an insert top wall, the insert top wall having an insert top wall slot top to permit separation of the insert side walls to receive the first cable within the insert.

6. A cable clamp and spacer assembly as set forth in claim 4 wherein the support housing includes a plurality of adhesive capsules positioned within the support housing, each of the adhesive capsules having a fluid adhesive therewithin, and the insert having at least one row of piercing legs cooperative with each adhesive capsule, with the piercing legs pivotally mounted to the insert and the piercing legs arranged for piercing a respective adhesive capsule and securing the piercing legs and the insert within the support housing.

* * * * *